United States Patent [19]

Fabre et al.

[11] 3,803,061

[45] Apr. 9, 1974

[54] MICROPOROUS PHENOLIC POLYETHER MEMBRANES

[75] Inventors: Albert Fabre, Venissieux; Alphonse Faure, Rhone, both of France

[73] Assignee: Rhone-Poulenc-S.A., Paris, France

[22] Filed: July 18, 1972

[21] Appl. No.: 272,753

[30] Foreign Application Priority Data
July 21, 1971 France .............................. 71.26708

[52] U.S. Cl. ......... 260/2.5 M, 260/292 R, 260/30.2, 260/30.4 R, 260/32.4, 260/32.6 R, 260/32.8 R, 260/33.4 R, 260/33.6 R, 260/33.8 R, 161/89, 161/95
[51] Int. Cl. ............................................. C08g 53/08
[58] Field of Search .............................. 260/2.5 M

[56] References Cited
UNITED STATES PATENTS
3,450,650  6/1969  Murata ........................... 260/2.5 M
3,306,875  2/1967  Hay ................................. 260/47 ET Primary Examiner—John C. Bleutge
Assistant Examiner—Morton Foelak
Attorney, Agent, or Firm—Stevens, Davis, Miller & Mosher

[57] ABSTRACT

Microporous phenolic polyether membranes are provided having utility in electricity generators, devices for the oxygenation of the blood, degassing of solution, ultrafiltration and the like. These membranes comprise a film of a phenolic polyether which has, on each of its faces, pores of diameter between about 0.1 and 25µ, at least some of these pores passing through the entire thickness of the membrane. They can be obtained by:

a. forming a solution of the phenolic polyether with a solvent and a non-solvent for this polymer, the solvent and non-solvent being miscible with one another, b. casting this solution on a temporary support, c. leaving the polymer layer on the support in air for about 1 second to 3 minutes, at a temperature of between 10°C and the boiling point of the most volatile constituent of the solution, d. immersing the polymer layer, still on its support, in a coagulation bath, and e. separating the membrane from the support and drying it.

11 Claims, No Drawings

MICROPOROUS PHENOLIC POLYETHER MEMBRANES

This invention relates to microporous phenolic polyether membranes.

Membranes of phenolic polyethers, also called poly(phenylene) oxides, have already been described in, for example, French Pat. No. 1,458,476. Such membranes, which are in the form of films which are free from micropores, are essentially of use in applications which employ a gas permeation process such as in the fractionation of gaseous mixtures with the enrichment or depletion of one or more of the constituents of these mixtures.

Membranes of phenolic polyethers with an asymmetric structure have also resently been described (see, for example, French Application No. 70/38,734). These anisotropic membranes differ from the other membranes in having a very thin dense layer, free from micropores, forming the active part of these membranes, and a porous layer, the thickness of which can be as much as 500 $\mu$; this porous layer does not possess any gas permeation properties and is present essentially to support the active layer. Because of the low thickness of the active layer, these membranes have an extremely high permeability to gases.

The common characteristic of these prior art membranes is that they have, at least over a part of their thickness, a non-porous layer which is selective towards gases. It is however desirable, and sometimes necessary, to make use of porous membranes in various fields such as in the manufacture of electricity generators, devices for the oxygenation of blood, degassing of solutions, especially aqueous solutions and fractionation by ultrafiltration. We have now discovered, according to the present invention, membranes of phenolic polyethers which are porous.

According to the present invention there is provided a membrane of a phenolic polyether which comprises a film of a phenolic polyether which has, on each of its faces, pores of diameter between 0.1 and 25$\mu$, at least a part of the pores visible at the surface passing, without interruption, through the entire thickness of the film.

The presence of pores on the surfaces of the membranes of this invention can be detected by optical examination or by examination under an electron microscope. The existence of continuous pores connecting the two faces of the membrane can be demonstrated by the properties of this membrane, for example as regards its permeation to gases; in effect, it has been observed that the selectivity of this membrane towards the following gases: $O_2$, $N_2$, $H_2$ and $CO_2$ is zero. In accordance with the explanation generally accepted for the mechanism of gas permeation across a polymer film (see, for example, Leibovits, Modern Plastics, March, 1966), this absence of selectivity by the membranes of this invention implies that the polymer layer is discontinuous, that is to say that it is traversed from surface to surface by continuous pores.

The expression "continuous pores", as used herein, is intended to mean any cavity which has an opening on both faces of the membrane: in other words the "continuous pores" may be substantially cylindrical channels or cavities of various regular or irregular shapes. The actual diameter of the pores at a given point within the membrane, can, in fact, be very different from the diameter of the pores at the surfaces of the membrane. In general terms, it is possible to establish that the ratio:

$$\frac{\text{average diameter of the pores in the interior of the membrane}}{\text{average diameter of the pores at the surface of the membrane}}$$

is between 0.1 and 10.

The phenolic polyethers used in the manufacture of the membranes of this invention generally consist essentially of a plurality of units of the formula:

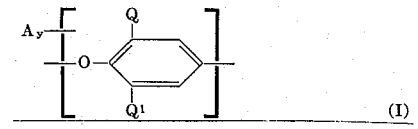

in which Q represents a phenyl radical, Q' represents a radical chosen from the group consisting of a phenyl radical, a phenyl radical substituted by 1 to 5 alkyl radicals with 1 to 8 carbon atoms, a biphenylyl radical, a terphenylyl radical or a naphthyl radical, A represents a halogen atom and y, the value of which can differ from one unit to another, is equal to 0, 1, 2, 3 or 4.

The specific viscosity of the phenolic polyethers used is generally between 0.3 and 1.5 (measured at 25°C as a 5 g/litre solution in cyclohexanone).

The polymers which are preferably used are those of formula (I) in which Q and Q' both represent a phenyl radical, y is zero or has an average value between 0.5 and 2, A representing, in the latter case, a chlorine atom. The specific viscosity of these polymers is preferably between 0.5 and 1 (measured as before).

The preparation of the polymers of formula (I) has already been described in the literature, for example as described in French Pat. No. 1,540,388 or U.S. Pat. No. 3,306,875.

The present invention also provides a process for producing the microporous membranes of this invention, which process comprises:

a. preparing a solution containing the phenolic polyether and a solvent and a non-solvent for the polymer, the solvent and the non-solvent being miscible with one another;

b. casting the solution obtained under a) on a temporary support;

c. leaving the layer of polymer on the support to stand in air for 1 second to 3 minutes at a temperature of between 10°C and the boiling point of the more (or most) volatile constituent of the solution defined under a);

d. immersing the polymer layer, still supported, in a coagulation bath; and e. separating the membrane from the support and drying it.

By way of illustration, typical solvents for the polymer which can be used include aliphatic and aromatic hydrocarbons, in particular cyclohexane, benzene and toluene, halogenated hydrocarbons such as dichloromethane, dichloroethylene, trichloroethylene, tetrachloroethylene, chloroform, dichlorobenzene and monochlorobenzene, cyclic ketones such as cyclohexanone and aprotic polar solvents such as N-methyl-2-pyrrolidone, dimethylformamide, dimethylacetamide and tetrahydrofurane. Suitable non-solvents for the polymer include water, alcohols such as methanol, ethanol and primary, secondary and tertiary butanols and acyclic ketones such as acetone and methyl ethyl ketone. It is to be understood that it is possible to use several solvents and/or non-solvents so long as these various liquids are miscible with one another.

The solubility of the polymer in the solvent/non-solvent mixture should be at least 5 percent by weight; naturally, this solubility depends on the nature of the solvents and non-solvents employed and on the proportion of the non-solvent in the mixture. In general terms, with the abovementioned liquids, and taking account of the solubility characteristics indicated above, the amount of non-solvent is between 5 and 30 percent, relative to the weight of the solvent/non-solvent mixture, and is preferably between 8 and 15 percent.

The concentration of the casting solution is usually between 2 and 30 percent expressed as g of polymer per g of solution). It is preferably between 10 and 20 percent.

When preparing this casting solution, it is possible to dissolve the polymer in the solvent/non-solvent mixture. Alternatively, it is possible to dissolve the polymer in the solvent and then introduce the non-solvent or to dissolve the polymer in a part of the solvent (or of the solvent/non-solvent mixture) and then introduce the remaining amount of solvent to which the non-solvent (or the remaining amount of the solvent/non-solvent mixture) has been added.

The dissolution of the polymer is generally carried out at ambient temperature. It is however possible to depart from this temperature or to begin the dissolution at a low temperature (for example, between 3° and 20°C) and then to increase the temperature (for example, up to 50°–70°C).

The membrane can be in various shapes, for example planar, tubular or spiral, depending on the shape of the support on which the polymer solution is cast; as for the material of which the support is made, it is generally glass or a metal such as stainless steel, although supports of other materials can also be used.

The casting can be carried out directly onto the support described above; it is also possible, if it is desired to manufacture reinforced membranes, to carry out the casting onto the reinforcement, the latter being itself applied to the support. The reinforcement generally consists of a woven fabric, a net, a knitted fabric or a non-woven fabric, made of natural or synthetic fibres.

The casting is generally carried out at ambient temperature (20° to 25°C). It is of course possible to depart from this temperature and to operate at for example, between 10° and 70°C.

The immersion of the film being formed in the coagulation bath is preceded by a dwell time in air. The aim of this dwell time is to help the solution to start to gel. Depending on the nature of the solvents and non-solvents employed, the duration of this dwell time preferably varies between 10 seconds and 2 minutes. During this stage of the process, the temperature is preferably between 15° and 50°C.

The coagulation bath can be chosen from amongst the non-solvents for the polymer, such as those described above. This bath can consist of a single non-solvent or a mixture of such products. Preferably, the coagulation bath consists of methanol, ethanol or a mixture of one of these alcohols with water. The purpose of the coagulation treatment is to gel the polymer solution or to complete the gelling which might have started during the previous stage. The coagulation should be continued until the maximum amount of the solvent present in the coagulated film has been extracted. Generally, this treatment is carried out at ambient temperature but it is possible to operate at any temperature between the freezing point and the boiling point of the coagulating liquid chosen.

The drying of the membrane is generally carried out by simply leaving it to stand in air at ambient temperature. It is however possible to accelerate the removal of the liquids present in the membrane by blowing a stream of air or inert gas such as nitrogen over it, and/or by raising the temperature. Generally, the latter should not exceed 100°C. The duration of the drying depends on the nature of the liquids employed in the preceding stages.

The microporous membranes of this invention, the thickness of which generally varies between 50 and 500$\mu$, have many properties. In particular, they possess a high heat resistance, which, for example, allows the membranes intended for medical use to be sterilised at a temperature which can be as high as 220°C. Amongst the other properties of these membranes, there may be mentioned their hydrophobic character, the possibility of heat-sealing them, their low substitution resistance, high flow rates with water and good stability towards basic materials. These various properties enable these membranes to be used as separators in accumulators, for the degassing of aqueous solutions, for example in accordance with the technique described in U.S. Pat. No. 3,507,708 and for carrying out gas exchanges with blood, for example in accordance with the technique described in French Pat. No. 1,568,130.

Furthermore, these membranes act as a barrier to substances of high molecular weight, for example greater than 70,000, which allows them to be used for the fractionation of solutions of such substances, for example by ultrafiltration. In this field, the membranes of this invention have the advantage of very high ultrafiltrate flow rates.

The following Examples further illustrate the present invention.

EXAMPLE 1

A polymer of formula I is used, in which Q and Q′ represent a phenyl radical and y is zero. This polymer has a specific viscosity of 0.744 (measured at 25°C as a solution containing 5 g/l in cyclohexanone).

10 g of this polymer are dissolved, at 21°C, with stirring, in a mixture consisting of 78 g of cyclohexanone and 12 g of isobutanol. The solution is left to stand for 1 hour, and is then filtered and extruded through a vertical die onto a drum, the lower part of which is immersed in a bath of methanol.

The die is 0.3 mm above the drum and the speed of rotation of the latter is such that the dwell time in air (21°C) of the layer of polymer solution deposited on the drum lasts for 1 minute 55 seconds. The bath of methanol is at 21°C and the duration of the polymer in the coagulation bath is 20 minutes. The membrane then passes over cylinders maintained at 23°C where it is completely dried after 15 minutes.

This membrane is 225$\mu$ thick. On each of its faces, it has pores of diameter between 15 and 25$\mu$. It does not show any selectivity towards oxygen, carbon dioxide, hydrogen and nitrogen, which indicates that at least some of the pores pass right through the membrane.

The rate of flow of air through this membrane, measured under a pressure of 0.95 bar (the pressure difference between the upstream and downstream sides of the membrane) is 1,900–2,000 m³/h m². The rate of flow of water, measured under a pressure of 0.05 bar (defined as above) is 6,000 to 7,500 l/day m². After being left for one hour in a chamber at 180°C, the rate of flow of water through the membrane remains unchanged. After being left for one hour in steam at 120°C, under a pressure of 2 bars, or after being left for one hour in steam at 135°C (3.2 bars), no change in the rate of flow of water is observed.

The substitution resistance of this membrane, as defined in French Pat. No. 1,584,187, and measured in an N aqueous solution of KOH, is 1 m. $\Omega$ dm².

EXAMPLE 2

The polymer described in Example 1 is used and a solution is prepared from 16 g of the polymer, 76 g of cyclohexanone and 8 g of isobutanol.

The solution, of viscosity 46 poises at 19°C, is extruded at this temperature as a film and the latter is coagulated in methanol as described in Example 1. The temperature of the coagulation bath is 23°C. The time the film passes in air (before coagulation) is 1 minute 12 seconds and the duration of the polymer in the coagulation bath is 12 minutes.

The film obtained after drying (as in the preceding Example) is 125$\mu$ thick. On each of its faces, it has pores of diameter between 5 and 15$\mu$. This film does not show any selectivity towards oxygen, nitrogen, carbon dioxide and hydrogen, which indicates that at least some of the pores pass right through the membrane.

This membrane has a rate of flow of water (pressure of 0.05 bar) of 3,350 l/day. m² and a substitution resistance of 7 to 8 m. $\Omega$ dm². After being treated for 1 hour in an N aqueous solution of KOH at 100°C, the flow rate is unchanged and the substitution resistance is 6 m. $\Omega$ dm². After being treated for 1 hour in an N aqueous solution of KOH at 130°C, the flow rate is 2,600 l/day m² and the substitution resistance is 5 m. $\Omega$ dm².

The properties indicated above show that this membrane is particularly suitable for use as a separator in an accumulator.

Under the usual conditions of ultrafiltration, (pressure 2 bars) the membrane has a rate of flow of water of 72,000 l/day.m².

In a fractionation procedure using ultrafiltration, of an aqueous saline solution of bovine albumin (M.W. of the albumin: 70,000, concentration of albumin: 1 g/l, concentration of NaCl: 9 g/l) the rate of flow of water under 2 bars pressure is 3,600 l/day.m² and the degree of rejection of the albumin is 60 percent.

The rates of flow of water indicated above are not altered by:
 treatment of the membrane in an oven at 180°C (1 hour)
 treatment in steam at 120°C (1 hour — 2 bars)
 treatment in steam at 135°C (1 hour — 3.2 bars).

EXAMPLE 3

A solution is prepared from 14 g of the polymer of Example 1, 83 g of cyclohexanone and 3 g of isobutanol.

This solution, of viscosity 6.2 poises at 19°C, is extruded at this temperature and is coagulated, in accordance with the technique described in Example 1, in a bath of methanol at 19°C. The duration of the polymer in air (19°C) is 80 seconds. The duration of the polymer in the coagulation bath is 14 minutes.

The membrane obtained after drying as in Example 1, the thickness of which is 130–140$\mu$, possesses a rate of flow of water of 860 l/day.m² (pressure 0.05 bar) and a substitution resistance of 15 m$\Omega$dm². On each of its faces, the membrane has pores of diameter between 0.5 and 5$\mu$, and it does not show any selectivity towards $O_2$, $CO_2$, $N_2$ and $H_2$.

After being treated for 1 hour in water at 100°C, the rate of flow of water (pressure 0.05 bar) is unchanged and the substitution resistance is 7 m $\Omega$ dm². After being treated for 1 hour in water (steam) at 130°C, the rate of flow of water is still unchanged and the substitution resistance is 7 m $\Omega$ dm².

Under a pressure of 2 bars, the rate of flow of water is 28,800 l/day.m².

In a fractionation procedure using ultrafiltration, (pressure 2 bars) of an aqueous saline solution of bovine albumin (M.W. of the albumin: 70,000, concentration of albumin: 1 g/l, concentration of NaCl: 9 g/l), the degree of rejection is 90 percent and the flow rate is 2,880 l/day.m².

We claim:

1. A phenolic polyether membrane comprising film of a phenolic polyether consisting essentially of a plurality of unit of the formula:

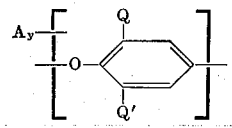

in which Q represents a phenyl radical, Q' represents a radical selected from the group consisting of a phenyl radical, a phenyl radical substituted by up to 5 alkyl radicals with 1 to 8 carbon atoms, a biphenylyl radical, a terphenylyl radical or a naphthyl radical, A represents a halogen atom and y, the value of which can vary from one unit to another, is equal to 0, 1, 2, 3 or 4, the film, having on each of its faces, pores of diameter between about 0.1 and 25 $\mu$, at least some of these pores passing through the entire thickness of the membrane.

2. A membrane according to claim 1 in which Q and Q' both represent a phenyl radical and y is 0, or has an average value between 0.5 and 2 in which case A represents a chlorine atom.

3. A membrane according to claim 1 in which the specific viscosity of the phenolic polyether is between 0.3 and 1.5 (measured at 25°C as a 5g/l solution in cyclohexanone).

4. A membrane according to claim 3 in which the said specific viscosity of the phenolic polymer is between 0.5 and 1.

5. A membrane according to claim 1 in which the film is reinforced by a woven, non-woven or knitted fabric of natural or synthetic fibres.

6. Process for preparing a phenolic polyether membrane as claimed in claim 1 which comprises:
 a. forming a solution of the phenolic polyether with a solvent and a non-solvent for this polymer, the solvent and non-solvent being miscible with one another, b. casting this solution on a temporary support,
c. leaving the polymer layer on the support in air for about 1 second to 3 minutes, at a temperature of between 10°C and the boiling point of the most volatile constituent of the solution,
d. immersing the polymer layer, still on its support, in a coagulation bath, and
e. separating the membrane from the support and drying it.

7. Process according to claim 6 in which the solvent for the polymer is cyclohexane, benzene, toluene, dichloromethane, dichloroethylene, trichloroethylene, tetrachloroethylene, chloroform, dichlorobenzene, monochlorobenzene, cyclohexanone, N-methyl-2-pyrrolidone, dimethylformamide, dimethylacetamide or tetrahydrofurane.

8. Process according to claim 6 in which the non-solvent for the polymer is water, methanol, ethanol, primary, secondary or tertiary butanol, acetone or methyl ethyl ketone.

9. Process according to claim 6 in which the non-solvent amounts to between about 8 and 15 percent by weight based on the weight of the solution.

10. Process according to claim 6 in which the coagulation bath comprises methanol, ethanol or an aqueous solution thereof.

11. A phenolic polyether membrane whenever prepared by a process as defined in claim 6.

* * * * *